United States Patent [19]

Bart

[11] 4,168,688
[45] Sep. 25, 1979

[54] METERING VALVE FOR FUEL INJECTION
[75] Inventor: Hansueli Bart, Whitehall, Mich.
[73] Assignee: Eaton Corporation, Cleveland, Ohio
[21] Appl. No.: 689,327
[22] Filed: May 24, 1976

Related U.S. Application Data

[63] Continuation of Ser. No. 403,308, Nov. 3, 1973, abandoned.

[51] Int. Cl.² ............... F02M 39/00; F02M 57/00
[52] U.S. Cl. ..................... 123/139 E; 123/139 AL
[58] Field of Search ................. 123/139 E, 139 AL

[56] References Cited

U.S. PATENT DOCUMENTS

| | | | |
|---|---|---|---|
| 3,719,435 | 3/1973 | Eheim | 123/139 E |
| 3,752,137 | 8/1973 | Kimberley | 123/32 G |
| 3,777,731 | 12/1973 | Kobayashi et al. | 123/139 BD |
| 3,797,235 | 3/1974 | Eheim | 123/139 E |

Primary Examiner—Samuel W. Engle
Assistant Examiner—Thomas H. Webb
Attorney, Agent, or Firm—R. J. McCloskey; D. Wood; P. Rulon

[57] ABSTRACT

A pilot fuel injection system for a diesel engine. One embodiment of the system includes a high pressure fuel pump, an accumulator, a mechanical fuel distributor, a pair of fuel metering valves for each cylinder of the engine, a fuel injection nozzle for each cylinder, and an electronic logic for controlling actuation of the metering valves; in a second system embodiment a pair of the metering valves supply fuel to all of the engine cylinders. Several embodiments of the metering valve are disclosed, some of which allows exclusion of the mechanical fuel distributor from the system. All of the disclosed metering valves meter fuel from the pump to the nozzles by traversing a passage in a valving member across another passage. Motion is imparted to the valving member by electromagnetic means which are energized by the electronic logic. The logic is responsive to engine speed and throttle position.

56 Claims, 9 Drawing Figures

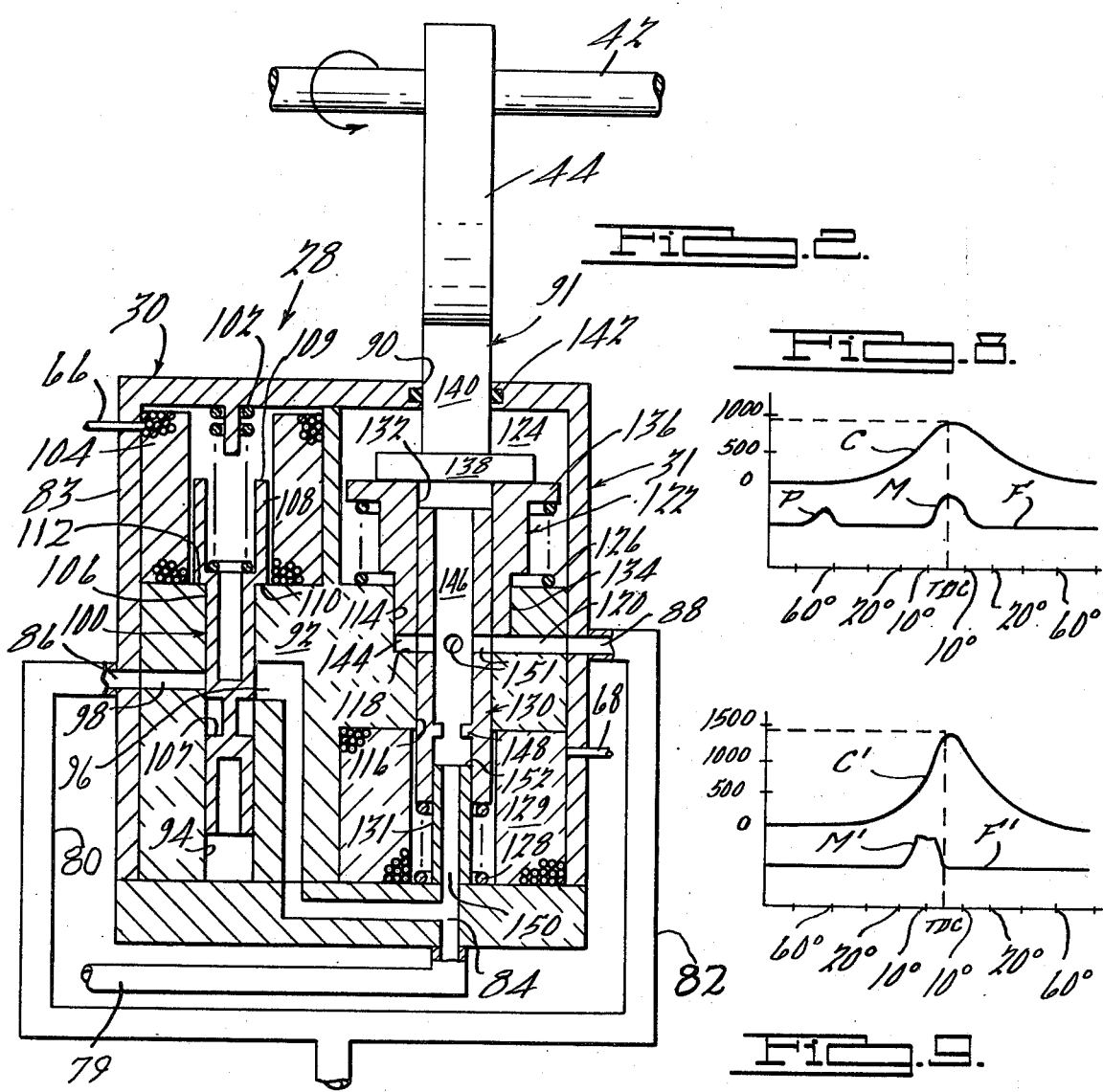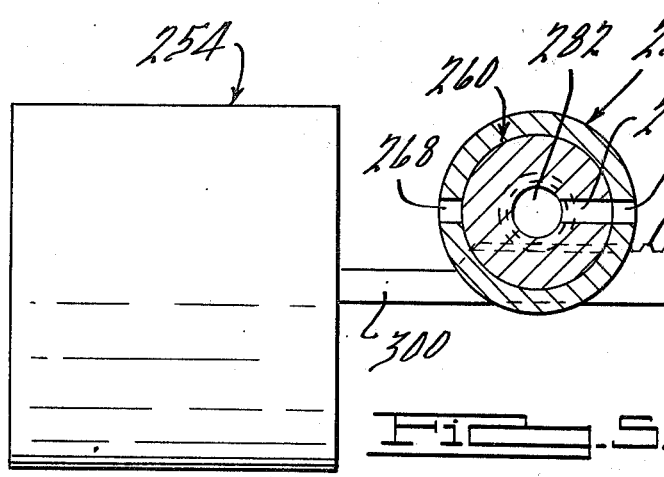

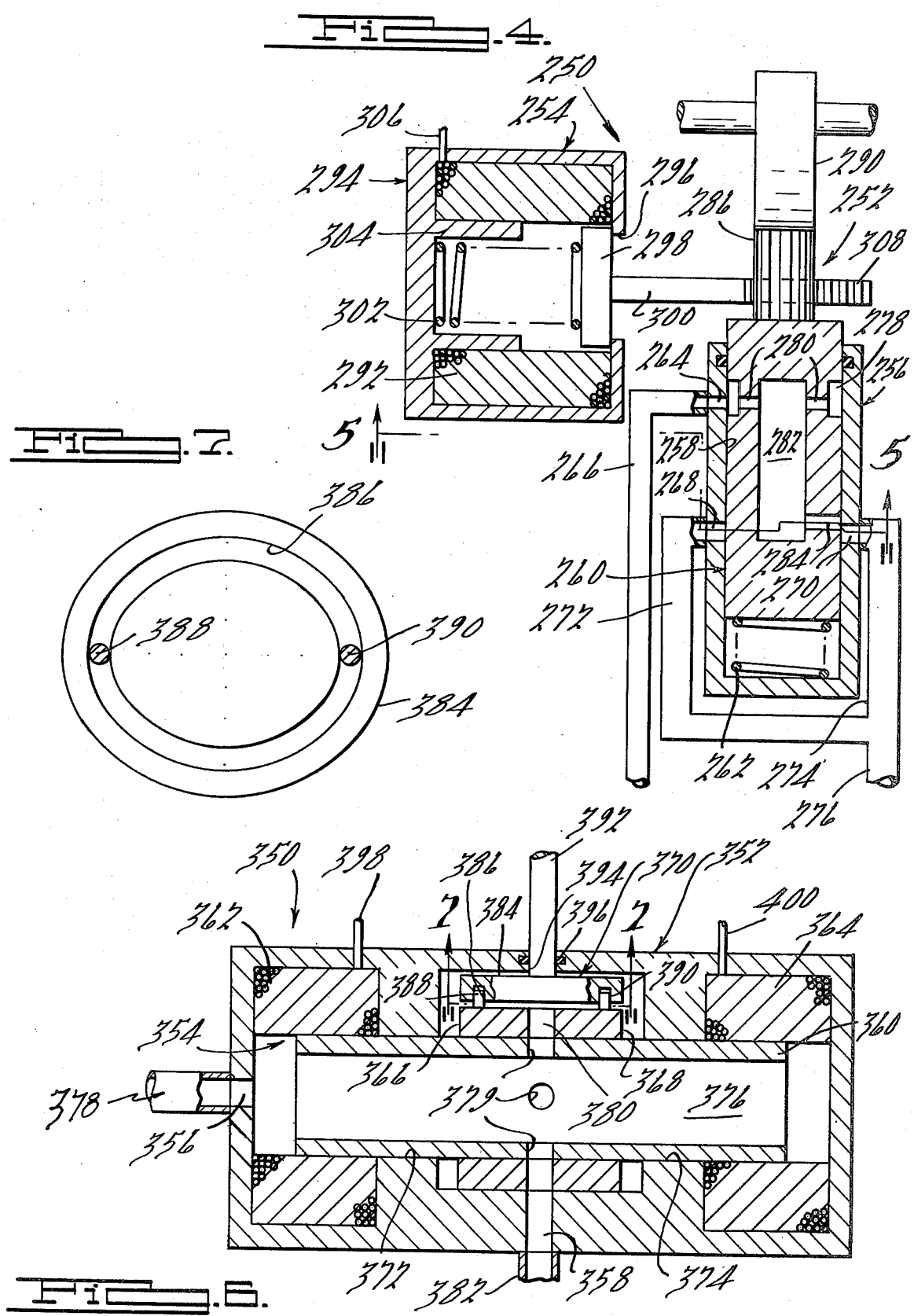

METERING VALVE FOR FUEL INJECTION

This is a continuation of application Ser. No. 403,308, filed Nov. 3, 1973, now abandoned.

FIELD OF THE INVENTION

This invention relates to a fluid metering valve; more specifically, to a fuel metering valve in a direct injection fuel system used on a compression ignition engine.

BACKGROUND OF THE INVENTION

Fuel injection systems for internal combustion engines are well known. Likewise, methods and advantages of pilot fuel injection are known, having been described by Dr. P. H. Schweitzer, "What can be Gained by Pilot Injection" Automotive Industries, Vol. 79 (1938), pp 533-534; G. Monnot et al, U.s. Pat. No. 2,966,079; and P. Eyzat, U.S. Pat. No. 3,439,655. Dr. Schweitzer's article points out some of the advantages obtainable with pilot injection, e.g. elimination of the characteristic diesel knock by reducing the rate of cylinder pressure rise per degree of crankshaft rotation, lower peak cylinder pressure, increased power output, and a reduction in fuel consumption per horsepower hour. Dr. Schweitzer also identifies a problem encountered when attempting to reduce the pilot fuel injection concept to practice; specifically, providing a fuel metering valve which produces a stable pilot charge over the full operating range of the engine.

Since Dr. Schweitzer's contributions, researchers have confirmed the stated advantages of the pilot fuel injection concept and in addition have discovered that the concept can be used to reduce pollutant exhaust emissions, such as oxides of nitrogen, while retaining the stated advantages. However, the problem of economically reducing the concept to practice in a manner that provides all of the obtainable advantages of the concept over the full operating range of the engine has remained unsolved. To obtain all of the possible advantages of the pilot injection concept, the injection system must be capable of accurately metering very small amounts of pilot fuel to the engine cylinder followed by an equally accurately metered main fuel charge; the timing of the pilot and main charges must be variable with respect to the crankshaft timing; the timing to the pilot charge must be variable with respect to the main charge; the amount of the main charge must of course be variable; and in some cases the amount of the pilot charge must be variable to obtain ultimate results.

SUMMARY OF THE INVENTION

An object of this invention is to provide a fuel injection system having a simple and low cost metering valve capable of metering a very small and accurate pulse of fuel.

Another object of this invention is to provide a fuel injection system having a metering valve which is readily controlled to vary the amount of fuel in each pulse metered by the valve.

According to an important feature of this invention, the injection system includes a high pressure fuel pump and an injection nozzle which delivers fuel directly to an engine cylinder when the metering valve momentarily communicates the pump with the nozzle. The metering valve includes a housing having a bore, a valving member disposed in the bore, and inlet and outlet passages which open at one of their passage ends into the bore and which communicate respectively with the pump and nozzle at their other ends. The valving member is moveable back and forth along a path in the bore between first and second positions with ports so disposed along the path of travel that the valving member functions to block communication between the inlet and outlet passages at either the first or second position. The valving member includes a passage means which completely traverses one of the inlet or outlet passage openings while the valving member moves from one of the positions to the other. During the traversing, a continuous passage is momentarily defined through the valve and since the velocity of the valving member need not be reversed during the time period that the continuous passage is defined, a very small and accurate fuel pulse may be metered through the valve.

According to another feature of the invention, the injection system includes a blocking or distributor means which allows fuel communication to the nozzle while the valving member moves in one direction along the path and blocks fuel communication while the valving member moves back along the path.

According to another feature of the invention, the injection system includes throttle responsive means for controlling the amount of fuel in the metered fuel pulse.

According to another feature of the invention, the injection system includes means for moving the valving member at velocities independent of engine rotational speed.

BRIEF DESCRIPTION OF THE DRAWINGS

Preferred embodiments of the invention are shown in the accompanying drawings in which:

FIG. 3 is a schematic view of a second pilot fuel injection system employing a double fuel metering valve;

FIG. 4 is a schematic cross-sectional view of another fuel metering valve;

FIG. 5 is a cross-sectional view of the valve in FIG. 4, looking in the direction of arrows 5—5 in FIG. 4.

FIG. 6 is a schematic cross-sectional view of another single fuel metering valve;

FIG. 7 is a cross-sectional view of a portion of the valve in FIG. 6, looking in the direction of arrows 7—7 in FIG. 6.

FIG. 8 is an oscilloscope trace of a fuel injection pulse and cylinder pressure for an engine cylinder provided with pilot fuel injection.

FIG. 9 is an oscilloscope trace of a fuel injection pulse and cylinder pressure for the same engine cylinder provided with a single pulse fuel injection system and operating at the same horsepower as the cylinder in FIG. 8.

DETAILED DESCRIPTION OF FIG. 1

Figure 1:
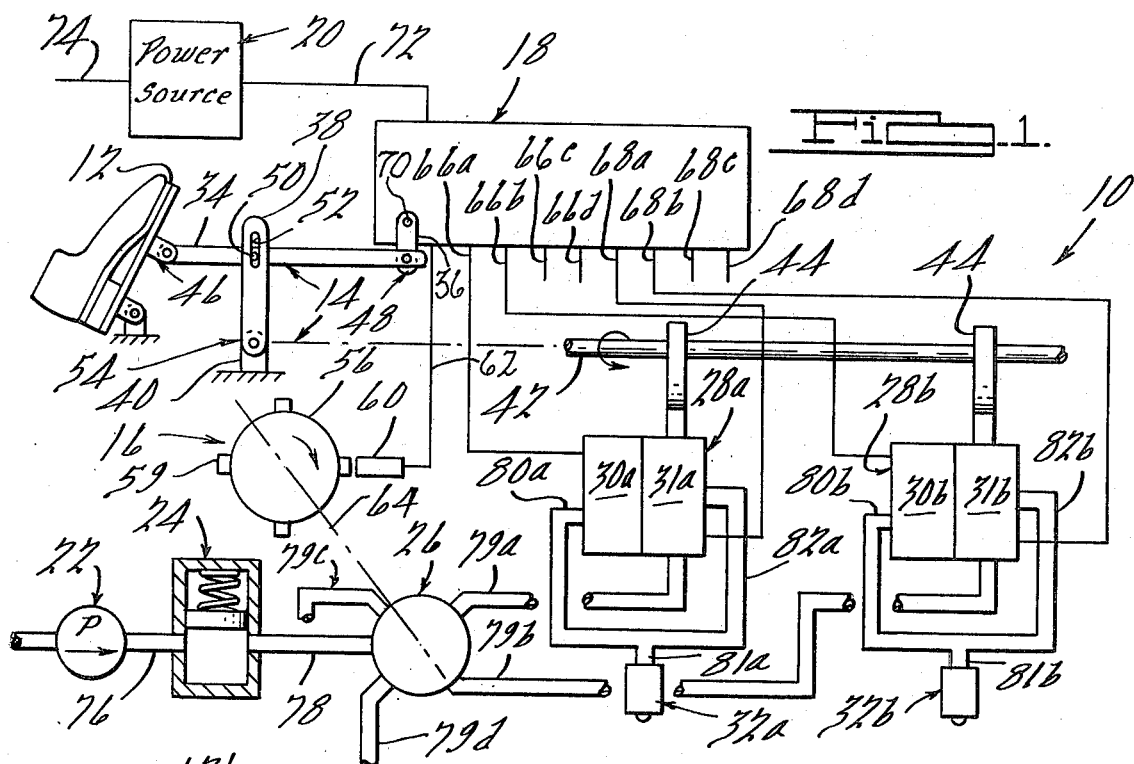
FIG. 1 is a schematic view of a portion of a pilot fuel injection system employing a double fuel metering valve.

FIG. 1 schematically illustrates a pilot fuel injection system 10 for a compression ignition piston engine, not shown. System 10 includes a throttle pedal 12 connected to a throttle linkage assembly 14, a magnetic pickup assembly 16, an electronic logic 18, a power source 20, a fuel pump 22, an accumulator 24, a mechanical fuel distributor 26, double fuel metering valves 28a and 28b and fuel injection valves 32a and 32b. The injection system of FIG. 1 is intended for a four cylinder engine and has one double fuel metering valve per cylinder; however, for simplicity only two valves are shown. Each of the double fuel metering valves contain a pilot fuel metering valve and a main fuel metering valve, e.g., valve 28a contains a pilot fuel metering valve 30a and a main fuel metering valve 31a, valve 28b contains a pilot fuel metering valve 30b and a main fuel metering valve 31b, etc. All of the components in FIG. 1 are shown schematically and all, except double fuel metering valves 28a and 28b may be per se of conventional design and construction; hence these conventional components require only brief comment to explain their individual and system functions.

Linkage assembly 14 includes a rod 34, a link 36, a crank arm 38, a support 40, a torque shaft 42, and cams 44. Rod 34 is pivotally pinned to throttle pedal 12 at 46 and to link 36 at 48. The upper end of crank arm 38 is connected to rod 34 via a pin 50 which is slideably disposed at one end in a slot 52 in arm 38 and at the other end fixed to rod 34. The lower end of crank arm 38 is pivotally connected to support 40 and securely fixed to torque shaft 42 at 54. Cams 44 are secured to rotate with shaft 42.

Magnetic pickup assembly 16 includes a toothed wheel 56 having four teeth 59 (one tooth per cylinder is shown for illustrational purposes) and a magnetic sensor 60. Toothed wheel 56 is driven at camshaft speed. Rotation of wheel 56 induces a cyclic signal into sensor 60 which is connected to logic 18 via wire 62. The period of the cyclic signal is of course a function of the number of teeth 59 and the rotational speed of the wheel. A phantom line 64 merely shows that toothed wheel 56 and mechanical distributor 26 are driven from a common shaft (not shown) and at the same speed.

Electronic logic 18 is a distributor and timing device which provides electrical signals to pilot fuel metering valves 30a and 30b via wires 66a and 66b and main fuel metering valves 31a and 31b via wires 68a and 68b. Wires 66c, 66d, 68c, and 68d are for providing electrical signals to additional pilot and main fuel metering valves. The distributor portion of the logic is preprogrammed to provide the electrical signals to actuate the pilot and main fuel metering valves in the engine firing order. The timing portion of the logic adjusts the timing of the electrical signals with respect to top dead center (TDC) of the crankshaft for each cylinder in response to engine speed and throttle position. The logic adjusts timing by first interpreting the speed signal from sensor 60 and advancing or retarding the pilot and/or main metering valve electrical signals with respect to TDC and/or each other as a function of speed. The logic then interprets the throttle position, which is supplied to the logic via a shaft 70 secured to link 36 and projecting into logic 18; the logic responds to the angular position of shaft 70 and advances or retards the pilot and/or main metering valve electrical signals with respect to TDC and/or each other as a function of throttle position which is in essence a demand signal to the logic. A simplified version of a logic that will readily provide the basic function of logic 18 may be found in U.S. Pat. No. 2,077,259.

Power source 20 supplies electrical energy to logic 18 via a wire 72. The power source may be the engine electrical generating and storage battery system; however, it is preferably a constant voltage regulating device which is connected to the engine generator and storage battery system via a wire 74.

Fuel pump 22, accumulator 24, and mechanical fuel distributor 26 are of conventional construction and are well known in the art. Pump 22 may be engine driver and supplies high pressure fuel to accumulator 24 via a tube 76. The fuel pressure supplied by pump 22 may be in the order of 4,000 to 10,000 psi or more; however, the term high, as used herein, is not confined to these pressures, but rather should be construed to distinguish the high pressure required for fuel injection into an engine cylinder over the relatively low pressure required for fuel injection into an engine intake manifold. Accumulator 24 dampens fuel pressure pulses. A tube 78 supplies high pressure fuel to distributor 26. Distributor 26 is of the well known type having a fixed disc with a plurality of fuel outlet ports connected to tubes 79a, 79b, 79c, and 79d and a rotating disc with a single inlet port. The rotating disc is driven at camshaft speed and the inlet sort is in constant communication with the high pressure fuel in tube 78; the inlet port traverses the outlet ports and pressurizes tubes 79a, 79b, 79c, and 79d in the engine firing order. Tube 79a supplies fuel to valve 28a; 79b supplies fuel to valve 28b, etc. A common fuel inlet passage in the housing of each valve 28a and 28b communicates the high pressure fuel to the pilot and main fuel metering valves in that housing. The fuel inlet ports in the rotating or the fuel outlet ports in the fixed disc of the distributor should be arcuate slots to ensure a supply of high pressure fuel to each double fuel metering valve for a period that covers the timing range of each cylinder.

Each double fuel metering valve is connected to a fuel injection nozzle which discharges directly into an engine cylinder (not shown). Fuel metered by pilot fuel metering valve 30a flows to fuel injection nozzle 32a via tubes 80a and 81a; fuel metered by main fuel metering valve 31a flows to fuel injection nozzle 32a via tubes 82a and 81a. Valves 30b and 31b are connected to nozzle 32b via tubes 80b, 81b and 82b in the same manner.

DETAILED DESCRIPTION OF FIG. 2

Figure 2:
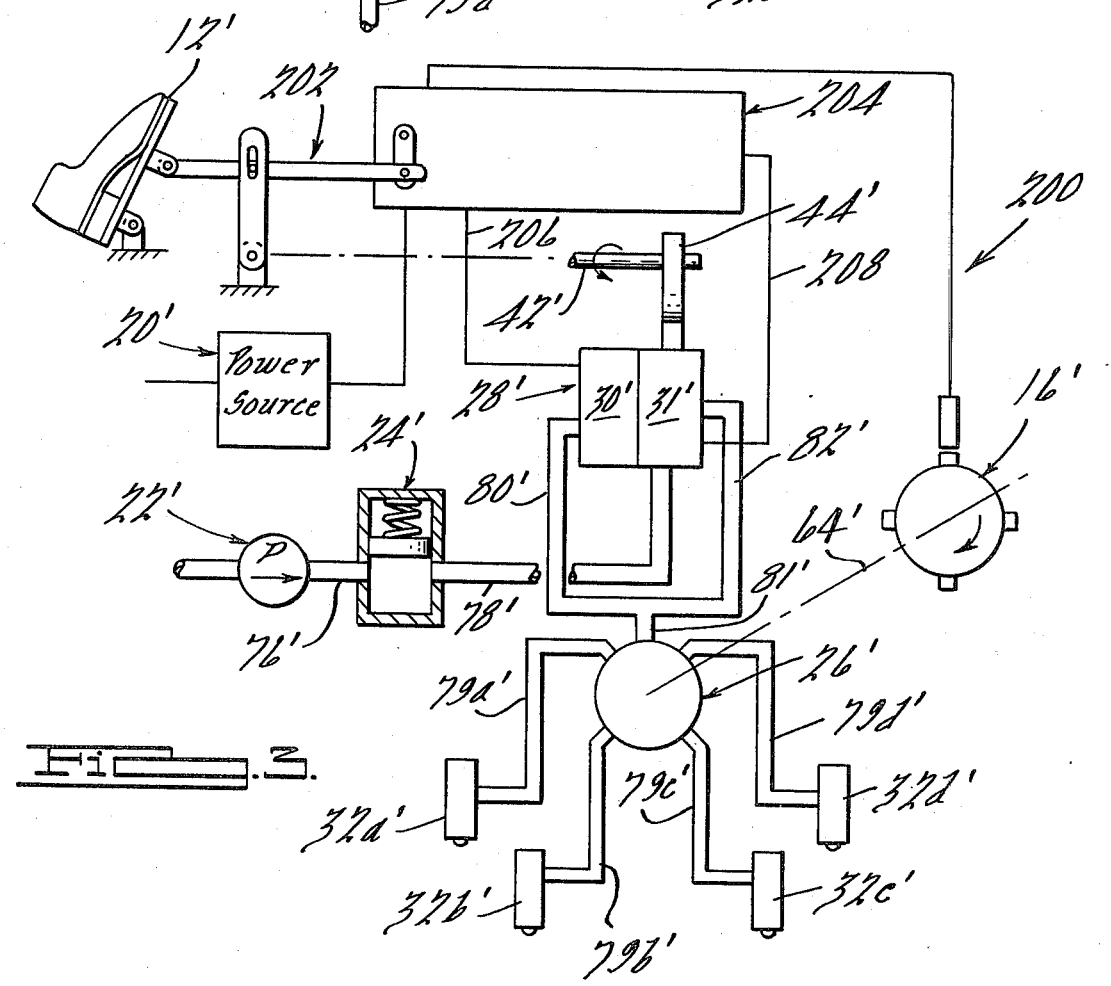
FIG. 2 is a schematic, cross-sectional view of a double fuel metering valve for use in the system of FIG. 1.

The structure and operation of each double fuel metering valve 28 is the same, hence, an explanation of one will suffice for all. FIG. 2 illustrates the conceptional details of valve 28. Double fuel metering valve 28 includes a housing 83, which encloses the pilot fuel metering valve 30 and main fuel metering valve 31, a fuel inlet passage 84, two fuel outlet passages 86 and 88, and an opening 90 through which passes a cam follower 91. The body of valves 30 and 31 are machined from a single metal block 92.

The pilot fuel metering valve is vertically disposed in the left portion of housing 83 and includes a bore 94, a fuel inlet passage 96 communicating passage 84 with bore 94, a fuel outlet passage 98 communicating bore 94 with passage 86, a shuttle or movable valving member 100, a helical spring 102, and an electromagnetic coil 104 connected to wire 66. Movable valving member 100 includes a stem portion 106 in slideable sealing contact with the walls of bore 94, an annular groove 107, and a cup-shaped portion 108. The upper extent of cupshaped portion 108 defines an annular rim 109 which engages the wall of housing 83 to limit upward travel of valving member 100. The lower extent of cup-shaped portion 108 defines a shoulder 110 which engages a shoulder 112 to limit downward travel of the valving member. When shoulders 110 and 112 are engaged annular groove 107 is below passage 98, whereby stem 106 blocks communication between passages 96 and 98. When rim portion 109 engages the wall of housing 83 groove 107 is above passage 98, whereby stem 106 blocks communication between passages 96 and 98. Hence, the range of travel of valving member 100 is defined by shoulders 110 and 112 in the downward direction and by rim 109 and the wall of housing 83 in the upward direction. Spring 102 biases valving member 100 downward. When coil 104 receives a pilot fuel injection signal from logic 18, via wire 66, an electromagnetic field is established which shuttles valving member 100 upward its full travel range against the biasing force of spring 102. Metering of the pilot fuel charge occurs only during upward travel of movable valving member 100 and only during the time period required for annular groove 107 to traverse passage 98. The pilot signal is maintained during the full timing range of each cylinder being supplied. At the end of the timing range distributor 26 blocks fuel flow to passage 96, the pilot signal is terminated by logic 18, and spring 102 then shuttles valving member 100 downward; this sequence prevents a second metering of fuel into passage 98 on the return stroke of movable valving member 100.

Main fuel metering valve 31 is vertically disposed in the right portion of housing 83. Valve 31 includes two axially aligned bores 114 and 116 which define a stepped bore having a shoulder 118, a fuel outlet passage 120 communicating with passage 88, a stepped sleeve 122 principally disposed in a chamber 124, cam follower 91, two helical springs 126 and 128, an electromagnetic coil 129, a cylindrical shuttle or movable valving member 130, and a cylindrical sleeve 131. Stepped sleeve 122 includes a bore 132 having the same diameter as bore 116, a reduced outer diameter 134 at its lower extent in slideable sealing contact with bore 114, and a radially extending flange 136 at its upper extent. Sleeve 122 is biased upward by spring 126. Cam follower 91 includes a radially extending flange 138 which rests on flange 136 and a round shaft portion 140 in sliding contact with cam 44. A seal 142 prevents fuel leakage around shaft portion 140. A passage (not shown) in flange 136 allows fluid communication between bore 132 and chamber 124. The lower end face of sleeve 122 cooperates with shoulder 118 to define an annular fuel passage 144 which is variable in vertical height or cross-sectional area in response to movement of sleeve 122 by cam 44. Annular passage 144 communicates bore 114 with passage 88. The outer wall of movable valving member 130 is in slideable sealing contact with the walls of bores 116 and 132. The inner wall of valve member 130 defines a fuel passage 146 which freely telescopes over cylindrical sleeve 131. A pair of stops 148 project inwardly from the wall of passage 146. Cylindrical sleeve 131 is fixed at its lower extent to housing 83, defines a passage 150 which communicates passages 84 and 146, and defines a stop 152 at its upper extent which cooperates with stops 148 to limit downward travel of the valving member. Valving member 130 also includes a plurality of radially extending ports 151 which communicate passage 146 with annular passage 144. Valving member 130 is biased upward to its rest or off position by spring 128.

Operation of main metering valve 31 differs from that of pilot metering valve in that the amount of metered fuel may be controlled by varying the vertical height of annular passage 144. When coil 129 receives a main fuel injection signal from logic 18, via wire 68, an electromagnetic field is established which shuttles valving member 130 downward until stops 148 and 152 engage. Metering of the main fuel charge occurs only during downward travel of the valving member and only during the time period required for ports 151 to traverse annular passage 144. The main fuel injection signal is maintained during the full timing range of the cylinder being supplied by each double metering valve. At the end of the timing range, which is coincident with that of the pilot valve, distributor 26 blocks fuel flow to passage 84, the main fuel injection signal is terminated by the logic, and spring 128 then shuttles valving member 130 upward; this sequence allows ports 151 to traverse annular passage 144 without causing a second flow of fuel into the annular passage.

DETAILED DESCRIPTION OF FIG. 3

FIG. 3 schematically illustrates a second embodiment of a pilot fuel injection system designated by the numeral 200. The principle difference between systems 10 and 200 is the position of the mechanical fuel distributor and the use of one double fuel metering valve in system 200; one double fuel metering valve supplies fuel to all of the engine cylinders and the fuel distributor directs the metered fuel pulses to the correct cylinder. The component parts of system 200 which are the same as those in system 10 are designated with numerals corresponding to those in FIG. 1 followed by a prime. System 200 includes a throttle 12' connected to a throttle linkage assembly 202, a magnetic pickup assembly 16', an electronic logic 204, a power source 20', a fuel pump 22', an accumulator 24', a mechanical fuel distributor 26', a double fuel metering valve 28', and four fuel injection nozzles 32a', 32b', 32c', and 32d'.

Linkage assembly 202 has one cam and differs from that of assembly 14 only in this respect. Logic 204 has one pilot fuel metering valve wire 206 and one main fuel metering valve wire 208; otherwise the logics are identical. High pressure fuel is continuously supplied to double fuel metering valve 28 by tube 78'.

DETAILED DESCRIPTION OF FIGS. 4 AND 5

FIGS. 4 and 5 schematically illustrate a second embodiment of a fuel metering valve 250 which is adaptable for use in the fuel injection systems of FIGS. 1 and 3. Valve 250 may be used as a main fuel metering valve or a pilot fuel metering valve; two of them may be combined into a single housing to provide a double fuel metering valve such as valve 28. In the following description valve 250 will function as a main fuel metering valve, this description being equally applicable to the valve functioning to meter pilot fuel by merely connecting the valve into the injection system for this function.

Metering valve 250 includes a metering valve assembly 252 and a drive assembly 254. Metering valve assembly 252 includes a cup-shaped housing 256 defining a cylindrical bore 258, a movable valving member 260, and a helical spring 262. A fuel inlet passage 264 in housing 256 communicates bore 258 with a source of high pressure fuel via a tube 266. In the systems of FIGS. 1 and 3, tube 266 would communicate directly with the fuel accumulator; hence, the mechanical fuel distributor would not be required in the system of FIG. 1. Two fuel outlet passages 268 and 270 in housing 256 communicate bore 258 with a fuel injection nozzle via a manifold consisting of tubes 272, 274 and 276; in the system of FIG. 1, tube 276 would communicate directly with fuel injection nozzle 32; in the system of FIG. 3 tube 276 would communicate with the injection nozzle via the mechanical fuel distributor 26. Movable valving member 260 is in slideable and rotatable sealing contact with the wall of bore 258. Valving member 260 has formed therein a number of intercommunicated passages for alternately communicating inlet passage 264 with outlet passages 268 and 270. These passages include an annular groove 278, a plurality of radially extending passages 280, a chamber-like passage 282, and a radially extending passage 284. Passages 278, 280 and 282 communicate passage 284 with passage 264 independent of the axial and rotational position of the movable valve member. A combination pinion and cam follower 286 is connected to the upper end of valving member 260 via a one-way clutch (not shown). The pinion portion provides a means for rotating the valving member. The cam follower portion provides a means for axially positioning the valving member in bore 258. The cam follower portion is biased into engagement with a cam 290 by spring 262 acting on the lower end of the valving member. Cam 290 is equivalent to the cams in FIGS. 1 and 3.

Drive assembly 254 includes an annular coil 292 contained in a housing 294 having an opening 296 in one end, a plunger 298 fixed to a rack 300 which extends through the opening, and a helical spring 302 which biases plunger 298 into engagement with the inside rim of opening 296. The rim of opening 296 provides a stop to limit rightward travel of the plunger and the rack when coil 292 is unenergized. A cylindrical sleeve 304 provides a stop for limiting leftward travel of the plunger and rack when coil 292 is energized via a wire 306. A portion of rack 300 is provided with a plurality of gear teeth 308 which engage the teeth of pinion 286. The unshown one-way clutch connecting pinion 286 to movable valving member 260 is arranged to provide a driving connection when rack 300 moves to the left and a slipping connection when the rack moves to the right. Each actuation of the coil rotates the movable valving member 180 degrees.

The static state of valve 250 a moment before the injection system logic supplies a main fuel injection signal is as follows, passage 284 is positioned either vertically up or down, passage 289 is displaced from or aligned with a plane passing through outlet ports 268 and 270, passage 284 is pressurized with high pressure fuel, and plunger 298 is against the rim of opening 296. The plane of alignment of passage 284 and passages 268 and 270 is a function of throttle position and is controlled by cam 290; the degree of plane alignment determines the amount of overlap of the passages as passage 284 traverses either passage 268 or 270 when the movable valve member is rotated. Hence, the rotational speed of the movable valve member can be the same for all engine speeds and loads and the amount of fuel metered can be varied as a function of the passage overlap. Further, drive assembly 254 may be replaced by a variable speed drive driven by the engine or an electric motor.

DETAILED DESCRIPTION OF FIGS. 6 AND 7

FIGS. 6 and 7 schematically illustrate a third embodiment of a fuel metering valve 350 which is adaptable to the fuel injection systems of FIGS. 1 and 3. Valve 350, like valve 250, meters either main fuel or pilot fuel and two of the valves may be combined into a single housing to provide a double fuel metering valve. Valve 350 includes a housing 352 having a central bore 354 and fuel inlet and outlet passages 356 and 358, respectively, a tubular shuttle or movable valving member 360 disposed in the bore, two annular coils 362 and 364, two annular sleeves 366 and 368, and a cam assembly 370. Bore 354 is principally defined by two annular lands 372 and 374 and sleeves 366 and 368, which are all concentric and of such diameter that a slideable sealing contact is established between them and the outer wall of movable valving member 360. The inner wall of movable valving member 360 defines a fuel passage 376 which communicates, at its inlet, with high pressure fuel in a tube 378 via inlet passage 356. In the system of FIGS. 1 and 3 tube 378 would communicate directly with the fuel accumulator. A plurality of radially extending fuel passages 379 in movable valve member 360 communicate passage 376 with an annular fuel passage 380 defined by the juxtaposed ends of sleeves 366 and 368. Annular passage 380 communicates with a tube 382 via outlet passage 358. In the system of FIG. 1 tube 382 would communicate directly with the fuel injection nozzle. In the system of FIG. 3 tube 382 would communicate with the fuel injection nozzle via the mechanical fuel distributor. The axial length or cross-sectional area of annular passage is controlled by cam assembly 370. Cam assembly includes an elliptical plate 384 having an elliptical groove 386 (best seen in FIG. 7), pins 388 and 390 which are securely fixed to sleeves 366 and 368, respectively, and a shaft 392 which is securely fixed to plate 386. Shaft 392 is rotatively supported in an opening 394 in housing 352; a seal 396 prevents fuel leakage around the shaft. Pins 388 and 390 are slideably received in groove 386 and impart a to and fro motion to the sleeves by moving the sleeves together or apart in response to rotation of shaft 392. When installed in the system of FIG. 1 shaft 392 would be equivalent to torque tube 42 and elliptical plate 384 and groove 386 would be equivalent to cam 44.

The movable valving member in valve 350 is controlled entirely by coils 362 and 364 which alternately receive main fuel injection signals from the electronic logic via wires 398 and 400, respectively. The electronic logic in a system using valve 350 would be modified to provide two main and pilot fuel injection wires per valve.

The oscilloscope traces in FIGS. 8 and 9 illustrate the respective difference in combustion chamber pressure for a cylinder provided with and without pilot fuel injection and operating at the same horsepower. In FIGS. 8 and 9 the abscissa is scaled in degrees of crankshaft rotation and the ordinate is sealed in pounds per square inch gauge. Curves C and C' shows combustion chamber pressure between approximately 90 degrees before and 90 degrees after top dead center of the compression and the power strokes, respectively. Curves F and F' are superimposed on the graphs to show the point of pilot and main fuel injection relative the crankshaft rotation. The rise P in curve F of FIG. 8 is the opening and closing of the fuel injection nozzle for pilot fuel injection; the rise M is the opening and closing of the fuel injection nozzle for main fuel injection. The rise M in FIG. 9 is the opening and closing of the fuel nozzle for main fuel injection.

The particular pilot fuel injection systems and fuel metering valves for use therein have been disclosed to illustrate the preferred embodiment of the inventions. However, it should be recognized that variations of the systems and valves are within the spirit of the total invention. For example, the amount of fuel metered by valve 350 could be controlled by varying the magnitude of the electrical signals to the coils and maintaining the cross-sectional area of passage 380 fixed, whereby the velocity of the movable valving member would be varied. Valve 350 could also be modified to incorporate some of the features of valve 250. For example, annular passage 380 could be changed to a passage of fixed dimensions such as passage 270 and passages 379 could be reduced to one passage such as passage 284; means could be provided to turn the movable valve member as a function of throttle position to vary the amount of passage overlap as passage 379 traverses passage 380.

I claim:

1. In a fuel injection system of the type including a high pressure fuel pump and a nozzle for delivering fuel to a combustion chamber of an internal combustion engine, the improvement comprising:

a valve housing including a bore, an inlet passage having an opening communicating at one end with said bore and at its other end with said high pressure fuel pump, and an outlet passage having an opening communicating at one end with said bore and at its other end with said nozzle;

a valving member moveable in said bore along a path from a first position blocking communication between said inlet and outlet passages to a second position blocking said communication;

passage means in said valving member operative during movement of said valving member along said path to traverse one of said passage openings for momentarily defining a continuous passage through said valve housing by serially connecting said inlet passage, said passage means, and said outlet passage while said passage means traverses said one passage opening; and blocking means driven in a timed relation with said valving member and operative to allow fuel communication between said pump and nozzle when said valving member is moved along said path from said first position to said second position and operative to block said fuel communication between said pump and said nozzle when said valving member is moving along said path from said second position to said first position.

2. The injection system of claim 1, further including:
actuation means for moving said valving member in said bore from said first position to said second position with a velocity that, at any given time, is independent of engine rotational speed whereby said traversing occurs at a velocity independent of engine speed.

3. The injection system of claim 1, further including:
actuation means for moving said valving member in said bore from said first position to said second position with a velocity that, at any given time, is independent of engine rotational speed and load, whereby said traversing occurs at a velocity independent of engine speed and load.

4. The injection system of claim 1, further including:
actuation means for moving said valving member axially in said bore from said first position to said second position.

5. The injection system of claim 1, further including:
solenoid means for moving said valving member from said first position to said second position.

6. The injection system of claim 1, further including:
actuation means for moving said valving member axially in said bore from said first position to said second position with a velocity that, at any given time, is independent of engine rotational speed, whereby the pressure and amount of fuel metered during axial traversing of said one of said openings is independent of engine speed while said valving member is moving from said first position to said second position.

7. The injection system of claim 1, further including:
actuation means for moving said valving member from said first position to said second position and from said second position to said first position with a velocity that, at any given time, is independent of engine speed.

8. The injection system of claim 1, wherein said nozzle delivers fuel directly to said combustion chamber, wherein said system includes a second nozzle for delivering fuel directly to a second combustion chamber of said engine, wherein said valving member moves axially in said bore along said path, and wherein said blocking means comprises:

distributor means sequentially operative to communicate said outlet passage of said valve housing with the first mentioned nozzle while said valving member moves along said path from said first position to said second position, then block communication between said outlet passage and said nozzles while said valving member moves back along said path from said second position to said first position, then communicate said outlet passage with said second nozzle while said valving member again moves along said path from said first position to said second position, and then block communication between said outlet passage and said nozzles while said valving member again moves back along said path from said second position to said first position.

9. The injection system of claim 8, further including:
actuation means for moving said valving member axially in said bore from said first position to said second position with a velocity that, at any given time, is independent of engine rotational speed.

10. The injection system of claim 8, further including:
solenoid means for moving said valving member from said first position to said second position.

11. The injection system of claim 1, wherein said nozzle delivers fuel directly to said combustion chamber, wherein said system includes a second nozzle for delivering fuel directly to a second combustion chamber of said engine, wherein said valving member moves axially along said path, and wherein said blocking means comprises:

distributor means sequentially operative to communicate said outlet passage of said valve housing with the first mentioned nozzle while said valving member moves along said path from said first position to said second position and then communicate said outlet passage with said second nozzle while said valving member moves back along said path from said second position to said first position.

12. The injection system of claim 11, further including:
actuation means for axially reciprocating said valving member between said first and second positions with a velocity that, at any given time, is independent of engine speed.

13. The injection system of claim 11, further including:
solenoid means for axially reciprocating said valving member between said first and second positions.

14. In a fuel injection system of the type including a high pressure fuel pump, throttle means, and a nozzle for delivering fuel directly to a combustion chamber of an internal combustion engine, the improvement comprising:

a valve housing including a bore, an inlet passage having an opening communicating at one end with said bore and at the other end with said high pressure fuel pump, and an outlet passage having an opening communicating at one end with said bore and at the other end with said nozzle;

a valving member axially moveable in said bore along a path from a first position blocking communication between said inlet and outlet passages to a second position also blocking said communication;

passage means in said valving member operative at some point during movement of said valving member along said path to traverse one of said passage openings for momentarily defining a continuous passage through said valve housing by serially connecting said inlet passage, said passage means, and said outlet passage for metering a pulse of fuel to said outlet passage during said traversing;

control means operative to vary the amount of fuel in said pulse in response to the position of said throttle means; and blocking means driven in a timed relation with said valving member and operative to allow fuel communication between said pump and nozzle when said valving member is moved along said path from said first position to said second position and operative to block said fuel communication when said valving member is moving along said path from said second position to said first position.

15. The injection system of claim 14, wherein said control means for varying the amount of fuel in said pulse includes:

means for varying the time period of said traversing in response to the position of said throttle means and independent of the moving velocity of said valving member.

16. The injection system of claim 14, further including:

actuation means for moving said valving member axially in said bore from said first position to said second position with a velocity that, at any given time, is independent of engine rotational speed, whereby said traversing occurs at a velocity independent of engine speed.

17. In a fuel injection system of the type including a high pressure fuel pump, throttle means, and first and second nozzles respectively associated with first and second combustion chambers of a piston engine and operative to deliver fuel directly to said combustion chambers, the improvement comprising:

a valve housing including a bore, an inlet passage having an opening communicating at one end with said high pressure fuel pump, and an outlet passage having an opening communicating at one end with said bore and at the other end with said nozzle;

a valving member moveable in said bore along a path from a first position blocking communication between said inlet and outlet passages to a second position also blocking said communication;

passage means in said valving member operative at some point during movement of said valving member along said path to traverse one of said passage openings for momentarily defining a continuous passage through said housing by serially connecting said inlet passage, said passage means, and said outlet passage for metering a pulse of fuel to said outlet passage during said traversing;

control means operative to vary the amount of fuel in said pulse in response to the position of said throttle means; and distributor means driven in a timed relation with said engine and sequentially operative to communicate said outlet passage with said first nozzle while said valving member moves along said path from said first position to said second position, then block communication between said outlet passage and said nozzles while said valving member moves back along said path from said second position to said first position, then communicate said outlet passage with said second nozzle while said valving member again moves along said path from said first position to said second position, and then block communication between said outlet passage and said nozzles while said valving member again moves back along said path from said second position to said first position.

18. The injection system of claim 17, wherein said control means for varying the amount of fuel in said pulse includes:

means for varying the time period of said traversing in response to the position of said throttle and independent of the moving velocity of said valving member.

19. The injection system of claim 17, further including:

actuation means for moving said valving member axially in said bore from said first position to said second position with a velocity that, at any given time, is independent of engine rotational speed, whereby said traversing occurs at a velocity independent of engine speed.

20. In a fuel injection system of the type including a high pressure fuel pump and a nozzle for delivering fuel to a combustion chamber of an internal combustion engine, the improvement comprising:

a valve housing including a bore, an inlet passage having an opening communicating at one end with said bore and at its other end with said high pressure fuel pump, and an outlet passage having an opening communicating at one end with said bore and at its other end with said nozzle;

a valving member moveable in said bore from a first position blocking communication between said inlet and outlet passages to a second position also blocking said communication;

passage means in said valving member operative at some point during movement of said valving member between said first and second positions to traverse one of said passage openings for momentarily defining a continuous passage through said valve housing by serially connecting said inlet passage, said passage means, and said outlet passage; and actuation means operative to move said valving member in said bore from said first position to said second position with a velocity that, at any given time, is independent of the rotational speed of said engine for effecting said traversing and metering a pulse of fuel at injection pressure to said nozzle during said traversing.

21. The injection system of claim 20, wherein said actuation means moves said valving member with a velocity that, at any given time, is also independent of engine load.

22. The injection system of claim 20, wherein said actuation means also includes means for moving said valving member from said second position to said first position with a velocity that, at any given time, is independent of engine speed.

23. The injection system of claim 20, wherein said actuation means axially moves said valving member from said first position to said second position with a velocity that is the same for all engine operating conditions.

24. The injection system of claim 20, wherein said actuation means includes:
   solenoid means for moving said valving member from said first position to said second position.

25. The injection system of claim 20, wherein said actuation means includes:
   solenoid means for axially moving said valving member from said first position to said second position.

26. In a fuel injection system of the type including a high pressure fuel pump, a throttle means, and a nozzle for delivering fuel directly to a combustion chamber of a piston engine, the improvement comprising:
   a valve housing including a bore, an inlet passage having an opening communicating at one end with said bore at the other end with said high pressure fuel pump, and an outlet passage having an opening communicating at one end with said bore and at the other end with said nozzle;
   a valving member axially moveable in said bore along a path between first and second positions which both block communication between said inlet and outlet passages;
   passage means in said valving member operative at some point during movement of said valving member between said first and second positions to traverse one of said passage openings for momentarily defining a continuous passage through said valve housing by serially connecting said inlet passage, said passage means, and said outlet passage for metering a pulse of fuel to said nozzle during said traversing as said valving member moves from said first position to said second position;
   control means operative to vary the amount of fuel in said pulse in response to the position of said throttle means; and
   actuation means operative to move said valving member in said bore from said first position to said second position with a velocity that, at any given time, is independent of the rotational speed of said engine for effecting said traversing and metering said pulse of fuel independent of the rotational speed of said engine.

27. The injection system of claim 26, wherein the control means for varying the amount of fuel in said pulse includes:
   means for varying the time period of said traversing in response to the position of said throttle means and independent of the moving velocity of said valving member.

28. In a pilot fuel injection system of the type including a high pressure fuel pump and nozzle means for delivering fuel directly to a combustion chamber of an internal combustion engine, the improvement comprising:
   pilot and main fuel metering valves each including a housing having a bore, an inlet passage having an opening communicating at one end with said bore and at the other end with said high pressure fuel pump, and an outlet passage having an opening communicating at one end with said bore and at the other end with said nozzle means,
   a valving member disposed in said bore and moveable along a path from a first position blocking communication between said inlet and outlet passages to a second position also blocking said communication, and
   passage means in said valving member operative during movement of said valving member along said path to traverse one of said passage openings for momentarily defining a continuous passage through said valve housing by serially connecting said inlet passage, said passage means, and said outlet passage;
   actuation means operative to move the pilot valving member from said first position to said second position and thereafter move said main valving member from said first position to said second position; and
   blocking means driven in a timed relation with said engine and actuation means and operative to allow fuel communication between said high pressure fuel pump and said nozzle means when said pilot and main valving members are moved along said path from said first positions to said second positions and operative to block said fuel communication between said pump and nozzle means when said valving members are moved back along said path from said second positions to said first positions.

29. The injection system of claim 28, wherein said actuation means includes:
   means for moving said valving members in said bores from said first positions to said second positions with velocities that, at any given time, are independent of engine rotational speed, whereby said traversings occur at velocities independent of engine speed.

30. The injection system of claim 28 wherein said actuation means includes:
   means for moving said valving members in said bores from said first positions to said second positions with velocities that, at any given time, are independent of engine rotational speed and load, whereby said traversings occur at velocities independent of engine speed and load.

31. The injection system of claim 28, wherein said actuation means includes:
   solenoid means for moving said valving members from said first positions to said second positions.

32. The injection system of claim 28 wherein said actuation means includes:
   means for moving said valving members from said first positions to said second positions and from said second positions to said first positions with velocities that, at any given time, are independent of engine speed.

33. The injection system of claim 28 wherein said system includes a second nozzle means for delivering fuel directly to a second combustion chamber of said engine, wherein said valving member moves axially in said bore along said path, and wherein said blocking means comprises:
   distributor means sequentially operative to communicate said outlet passages of said valve housings with the first mentioned nozzle means while said valving members move along said paths from said first positions to said second positions, then block communication between said outlet passages and said nozzles while said valving members move back along said paths from said second positions to said first positions, then communicate said outlet passages with said second nozzle means while said valving members again move along said paths from said first positions to said second positions, and then block communication between said outlet passages and said nozzle means while said valving members move back along said paths from said second positions to said first positions.

34. The injection system of claim 33 wherein said actuation means include:
means for moving said valving members axially in said bores from said first positions to said second positions with velocities that, at any given time, are independent of engine speed.

35. The injection system of claim 33 wherein said actuation means include:
solenoid means for moving said valving members from said first positions to said second positions.

36. The injection system of claim 28 wherein said system includes a second nozzle for delivering fuel directly to a second combustion chamber of said engine, wherein said valving members move axially along said paths, and wherein said blocking means comprises:
distributor means sequentially operative to communicate said outlet passages of said valve housings with the first mentioned nozzle means while said valving members move along said paths from said first positions to said second positions, and then communicate said outlet passages with said second nozzle means while said valving members move back along said paths from said second positions to said first positions.

37. The injection system of claim 36 wherein said actuation means include:
means for axially reciprocating said valving members between said first and second positions with velocities that, at any given time, are independent of engine rotational speed.

38. The injection system of claim 36 wherein said actuation means include:
solenoid means for axially reciprocating said valving members between said first and second positions.

39. In a pilot fuel injection system of the type including a high pressure fuel pump, throttle means and nozzle means for delivering fuel directly to a combustion chamber of a piston engine, the improvement comprising:
pilot and main fuel metering valves each including
a housing having a bore, an inlet passage having an opening communicating at one end with said bore and at the other end with said high pressure fuel pump, and an outlet passage having an opening communicating at one end with said bore and at the other end with said nozzle means,
a valving member disposed in said bore and moveable along a path from a first position blocking communciation between said inlet and outlet passages to a second position also blocking said communication, and
passage means in said valving member operative during movement of said valving member along said path to traverse one of said passage openings for momentarily defining a continuous passage through said valve housing by serially connecting said inlet passage, said passage means, and said outlet passage;
actuation means operative to move the pilot valving member from said first position to said second position to effect said traversing for said pilot valve and meter a pilot fuel pulse to the outlet passage of the pilot valve housing, said actuation means thereafter operative to move the main valving member from said first position to said second position to effect said traversing for said main valve and meter a main fuel pulse to the outlet passage of the main valve housing;
control means operative to vary the amount of fuel in at least one of said pulses in response to the position of said throttle means; and
blocking means driven in a timed relation with said engine and actuation means and operative to allow fuel communication between said outlet passages and said nozzle means when said pilot and main valving members are moved along said paths from said first positions to said second positions and operative to block said fuel communication between said outlet passages and nozzle means when said valving members are moved back along said paths from said second positions to said first positions.

40. The injection system of claim 39 wherein said control means for varying the amount of fuel in said one pulse include:
means for varying the time period of said traversing in response to the position of said throttle means and independent of the moving velocity of said valving member.

41. The injection system of claim 39 wherein said actuation means include:
means for moving said valving members axially in said bore at velocities that, at any given time, are independent of engine rotational speed.

42. In a pilot fuel injection system of the type including a high pressure fuel pump, throttle means, and first and second nozzle means respectively associated with first and second combustion chambers of a piston engine and operative to deliver fuel directly to said combustion chambers, said improvement comprising:
pilot and main fuel metering valves each including
a housing having a bore, an inlet passage having an opening communicating at one end with said bore and at the other end with said high pressure fuel pump, and an outlet passage having an opening communicating at one end with said bore and at the other end with said nozzle means,
a valving member disposed in said bore and moveable along a path from a first position blocking communication between said inlet and outlet passages to a second position also blocking said communication, and
passage means in said valving member operative during movement of said valving member along said path to traverse one of said passage openings for momentarily defining a continuous passage through said valve housing by serially connecting said inlet passage, said passage means, and said outlet passage;
actuation means operative to move the pilot valving member from said first position to said second position to effect said traversing for said pilot valve and metering of a pilot fuel pulse to the outlet passage of the pilot valve housing, said actuation means thereafter operative to move the main valving member from said first position to said second position to effect said traversing for said main valve and metering of a main fuel pulse to the outlet passage of the main valve housing;

control means operative to vary the amount of fuel in at least one of said pulses in response to the position of said throttle means;

distributor means driven in a timed relation with said engine and sequentially operative to communicate said outlet passages with said first nozzle means while said pilot and main valving members move along said paths from said first positions to said second positions, then block communication between said outlet passages and said nozzles while said valving members move back along said paths from said second positions to said first positions, then communicate said outlet passages with said second nozzle means while said valving members move again along said paths from said first positions to said second positions, and then block communication between said outlet passages and said nozzle means while said valving members again move back along said paths from said second positions to said first positions.

43. The injection system of claim 42 wherein said control means for varying the amount of fuel in said one pulse include:
means for varying the time period of said traversing in response to the position of said throttle means and independent of the moving velocity of said valving member.

44. The injection system of claim 42 wherein said actuation means include:
means for moving said valving member axially in said bore at velocities that, at any given time, are independent of engine rotational speed.

45. In a pilot injection system of the type including a high pressure fuel pump and nozzle means for delivering fuel directly to a combustion chamber of an internal combustion engine, the improvement comprising:
pilot and main fuel metering valves each including
a housing having a bore, an inlet passage having an opening communicating at one end with said bore and at the other end with said high pressure fuel pump, and an outlet passage having an opening communicating at one end with said bore and at the other end with said nozzle means,
a valving member moveable in said bore from a first position blocking communication between said inlet and outlet passages to a second position also blocking said communication, and
passage means in said valving member operative during movement of said valving member between said first and second positions to traverse one of said passage openings for momentarily defining a continuous passage through said valve housing by serially connecting said inlet passage, said passage means, and said outlet passage; and
actuation means operative to move the pilot valving member from said first position to said second position with a velocity that, at any given time, is independent of the rotational speed of said engine for effecting said traversing for said pilot valve and metering of a pilot fuel pulse at injection pressure to said nozzle means during said traversing, and thereafter move the main valving member from said first position to said second position with a velocity that, at any given time, is independent of the rotational speed of said engine for effecting said traversing for said main valve and metering a main fuel pulse at injection pressure to said nozzle means during said traversing.

46. The injection system of claim 45 wherein said actuation means moves said valving members with velocities that, at any given time, are also independent of engine load.

47. The injection system of claim 45 wherein said actuation means also includes means for moving said valving members from said second positions to said first positions with velocities that, at any given time, are independent of engine speed.

48. The injection system of claim 45 wherein said actuation means include:
solenoid means for moving said valving members from said first positions to said second positions.

49. In a pilot fuel injection system of the type including a high pressure fuel pump, throttle means, and nozzle means for delivering fuel directly to a combustion chamber of a piston engine, the improvement comprising:
pilot and main fuel metering valves each including
a housing having a bore, an inlet passage having an opening communicating at one end with said bore and at the other end with said high pressure fuel pump, and an outlet passage having an opening communicating at one end with said bore and at the other end with said nozzle means,
a valving member disposed in said bore and moveable along a path from a first position blocking communication between said inlet and outlet passages to a second position also blocking said communication, and
passage means in said valving member operative during movement of said valving member along said path to traverse one of said passage openings for momentarily defining a continuous passage through said valve housing by serially connecting said inlet passage, said passage means, and said outlet passage;
actuation means operative to move the pilot valving member from said first position to said second position with a velocity that, at any given time, is independent of the rotational speed of said engine for effecting said traversing for said pilot valve and metering a pilot fuel pulse at injection pressure to said nozzle means during said traversing and thereafter move the main valving member from said first position to said second position with a velocity that, at any given time, is independent of the rotational speed of said engine for effecting said traversing for said main valve and metering a main fuel pulse at injection pressure to said nozzle means during said traversing; and
control means operative to vary the amount of fuel in at least one of said pulses in response to the position of said throttle means.

50. The injection system of claim 49 wherein said control means for varying the amount of fuel in said one pulse includes:
means for varying the time period of said traversing in response to the position of said throttle means and independent of the moving velocity of said valving member.

51. In a pilot fuel injection system of the type including a high pressure fuel pump and nozzle means for delivering pulses of fuel directly to a combustion chamber of an internal combustion engine, the improvement comprising:

valve means for momentarily connecting said pump with said nozzle means and operative to sequentially meter a pilot fuel pulse and then a main fuel pulse, said valve means including a valve housing having bore means, inlet passage means connected at one end to said high pressure fuel pump and defining opening means at the other end communicating with said bore means, and outlet passage means connected at one end to said nozzle means and defining opening means at the other end communicating with said bore means;

valving means in said bore means moveable between first and second static positions blocking fuel communication between said inlet and outlet passage means;

pilot and main passages in said valving means operative during movement of said valving means between said first and second positions to completely traverse one of said opening means;

actuation means operative to move said valving means from said first static position to said second static position to effect a sequential traversing of said one opening means by said pilot and main passage means for sequentially metering said pilot pulse and then said main pulse.

52. The pilot fuel injection system of claim 51 wherein actuation means moves said valving means with a velocity that, at any given time, is independent of the rotational speed of said engine.

53. The pilot fuel injection system of claim 51, further includes:

distributor means driven in a timed relation with said valving means and operative to allow fuel communication between said pump and said nozzle means while said pilot and main passage traverse said one opening means during movement of said valving means from said first static position to said second static position.

54. The pilot fuel injection system of claim 51, further including:

second nozzle means for delivering pulses of fuel to a second combustion chamber of said engine; and distributor means driven in a timed relation with said valving means and sequentially operative to communicate said outlet passage means of said valve means with the first mentioned nozzle means while said valving means moves in one direction between said first and second static positions, then block communication between said outlet passage means and said nozzles while said valving means moves in the other direction between said first and second positions, then communicate said outlet passage means with said second nozzle means while said valving means again moves in said one direction, and then blocks communication between said outlet passage means and said nozzle means while said valving means again moves in said other direction.

55. The pilot fuel injection system of claim 51 further including:

second nozzle means for delivering pulses of fuel to a second combustion chamber of said engine; and distributor means sequentially operative to communicate said outlet passage means of said valve means with the first mentioned nozzle while said valving means moves in one direction between said first and second static positions and then communicate said outlet passage means with said second nozzle means while said valving means moves in the other direction between said first and second positions.

56. The pilot fuel injection system of claim 55 wherein said actuation means moves said valving means in both directions with a velocity that is the same for all engine operating conditions.

* * * * *